United States Patent Office 3,536,610
Patented Oct. 27, 1970

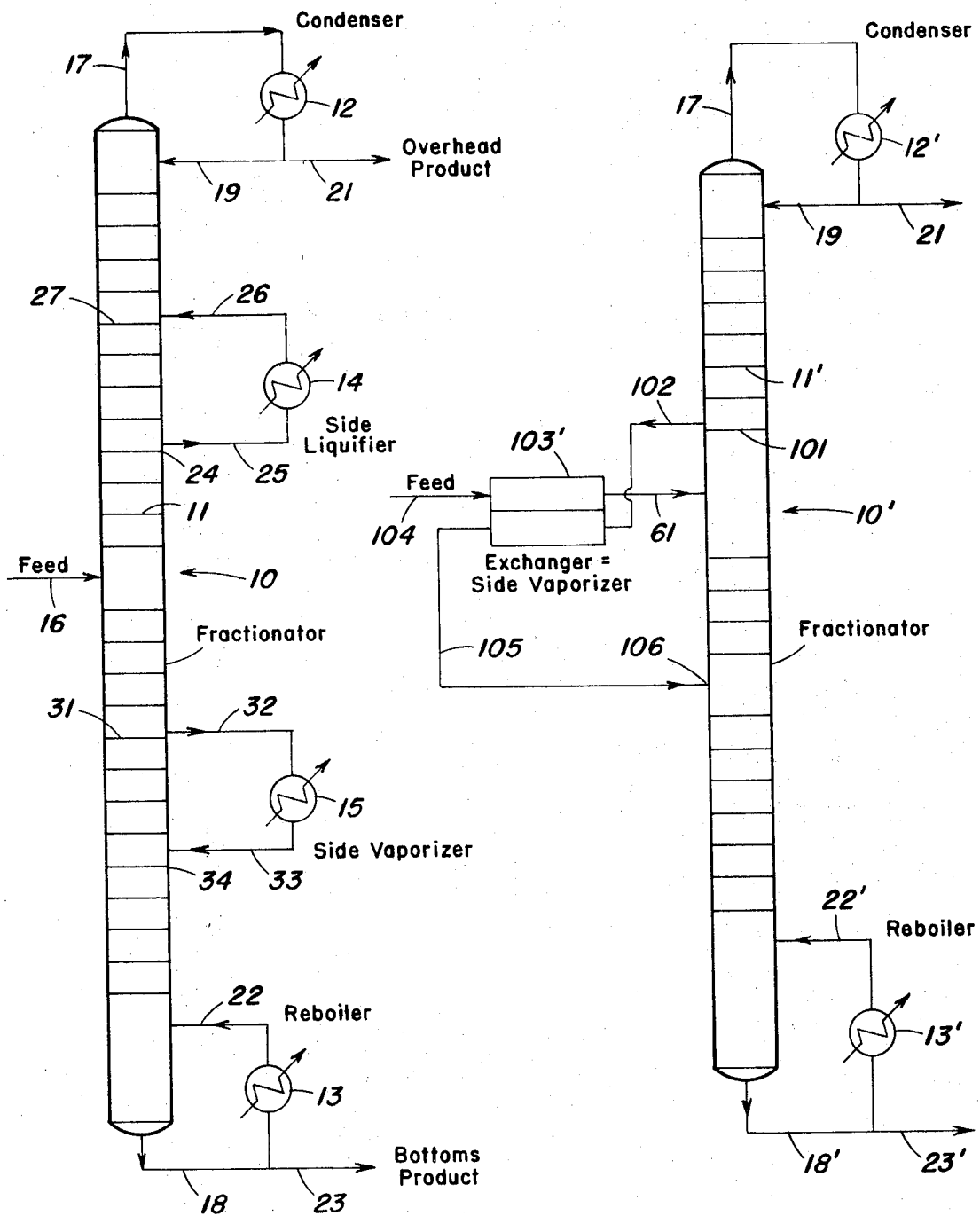

3,536,610
FRACTIONATION PROCESS
Karl Stork, New York, N.Y., assignor to The Lummus
Company, New York, N.Y., a corporation of Delaware
Filed Dec. 7, 1967, Ser. No. 688,803
Int. Cl. B01d *3/16;* C10g *7/00*
U.S. Cl. 208—340                                    9 Claims

ABSTRACT OF THE DISCLOSURE

An improved fractionation process wherein a sidestream is withdrawn from an intermediate contacting stage in a fractionation zone, either in liquid or vapor phase, the phase of the sidestream is substantially totally changed and the sidestream returned to the fractionation zone at the contacting stage having a fluid composition, in the same phase, most nearly approximating the composition of the sidestream. In this manner the condensation or vaporization of the withdrawn fluid is effected over the whole temperature range between the bubble point and dew point thereof, resulting in an overall heat savings.

---

This invention relates to the separation of fluids and more particularly to an improved fractionation process.

A liquid or gaseous mixture may be separated in a simple fractionator, consisting of a distillation column, containing a plurality of liquid-vapor contact stages, a reboiler and a condenser into an overhead product, containing predominately the more volatile component of the gaseous mixture, and a bottoms product, containing the less volatile component or components of the gaseous mixture. Occasionally, in order to increase the efficiency of the fractionator, side reboilers and/or condensers are provided. In employing a side condenser, vapor is withdrawn from a contacting stage in the rectification section of the fractionator, partially condensed in the side condenser and the two phase mixture returned to a contacting stage immediately above the withdrawal contacting stage. In employing a side reboiler, liquid is withdrawn from a contacting stage in the stripping section of the fractionator, partially vaporized in the side reboiler and the two phase mixture returned to a contacting stage immediately below the withdrawal contacting stage. Although the use of side reboilers and condensers, in the manner hereinabove described, increases the overall operating efficiency of a fractionator, there is a continuing need for still greater improvements in such efficiency.

Accordingly, an object of this invention is to provide a new and improved fractionation process.

A further object of this invention is to provide a new and improved fractionation process employing side reboilers and/or condensers.

Another object of this invention is to provide a more efficient fractionation process.

A still further object of this invention is to provide a fractionation process which is particularly applicable to separating components wherein there is a large temperature difference between the overhead and bottoms temperature.

Yet another object of this invention is to provide an improved fractionation process for recovering the components of natural gas.

These and other objects of the invention should be more readily apparent from the following detailed description of the invention when read with reference to the accompanying drawing wherein:

FIG. 1 is a schematic representation of a fractionator incorporating one embodiment of the invention; and FIG. 2 is a schematic representation incorporating another embodiment of the invention.

The objects of this invention are broadly accomplished by withdrawing a sidestream of either liquid or vapor, from an intermediate contacting stage of a fractionator, substantially totally changing the phase of the sidestream and returning the sidestream to the contacting stage in which the phase identical to the phase of the sidestream has a composition most nearly approximating the composition of the sidestream. Thus, if the sidestream is substantially totally changed to the liquid phase, the contacting stage to which the sidestream is returned is the contacting stage of the fractionator having a liquid composition most nearly approximating the composition of the sidestream. Similarly, if the sidestream is substantially totally in the vapor phase, the sidestream is returned to the contacting stage of the fractionator having a vapor composition most nearly approximating the composition of the sidestream. Stated in another way, if reboil is desired for a particular intermediate contacting stage, liquid is withdrawn from a stage having a liquid composition most nearly approximating the vapor composition of the particular stage and this liquid is substantially totally vaporized to supply such reboil. Similarly, if condensate is desired for a particular intermediate contacting stage, vapor is withdrawn from a stage having a vapor composition which most nearly approximates the liquid composition of the particular stage and the vapor substantially totally condensed to supply such condensate. It is to be understood that the term "intermediate contacting stage" as used herein denotes any contacting stage of the fractionator except the bottom and top contacting stages thereof.

The invention will now be described in more detail with respect to embodiments thereof illustrated in the drawing. It is to be understood that equipments, such as pumps, valves and the like have been omitted in order to facilitate the description of the embodiments and the placing of such equipments in appropriate places is deemed to be within the scope of those skilled in the art.

Referring now to FIG. 1, there is provided a fractionator 10, containing a plurality of contacting stages 11, e.g., plates, trays or the like, an overhead condenser 12 and a bottoms reboiler 13. The fractionator 10 is further provided with a side condenser 14 and a side reboiler 15.

In operation a feed, in either vapor, liquid or vapor-liquid mixed phase, is introduced into the fractionator 10 through line 16 and separated into an overhead, withdrawn through line 17, and a bottoms withdrawn through line 18. The overhead in line 17 is condensed in condenser 12 and a portion thereof passed as reflux through line 19 to the top contacting stage of fractionator 10. The remaining portion of the overhead is withdrawn through line 21 as overhead product. A portion of the bottoms in line 18 is passed through reboiler 13 and returned to the bottom contacting stages of fractionator 10 through line 22. The remaining portion of the bottoms in line 18 is withdrawn through line 23 as bottoms product.

A vapor sidestream is withdrawn from a contacting stage 24 through line 25 and passed through side condenser 14, provided with a suitable heat transfer medium, wherein the vapor is substantially totally condensed. The condensed vapor from side condenser 14 is passed through line 26 to a contacting stage 27, the contacting stage 27 being the contacting stage of fractionator 10 having a liquid composition most nearly approximating the liquid composition in line 26 .

A liquid sidestream is withdrawn from a contacting stage 31 through line 32 and passed through side reboiler 15, provided with a suitable heat transfer medium, wherein the liquid is substantially totally vaporized. The vapor from side reboiler 15 is passed through line 33 to a contacting stage 34, the contacting stage 34 being the contacting stage of fractionator 10 having a vapor composition most nearly approximating the vapor composition in line 33.

In FIG. 2, there is illustrated another embodiment of the invention, similar to the embodiment of FIG. 1 wherein like parts are designated by like prime numerals.

In accordance with the embodiment of FIG. 2, a liquid sidestream is withdrawn from the lowest contacting stage 101 of the rectification section of fractionator 10′ through line 102 and passed through heat exchanger 103 wherein the sidestream is substantially totally vaporized by indirect heat transfer with a feed stream for the fractionator, passed through line 104. The now vaporized stream from heat exchanger 103 is passed through line 105 to contacting stage 106 of fractionator 10′; the contacting stage 106 being the contacting stage having a vapor composition most nearly approximating the vapor composition in line 105.

The process of this invention may be modified in numerous ways without departing from the scope thereof. Thus, for example, a fractionator may be provided with one or more side condensers or side reboilers or may contain only a side reboiler or a side condenser, so long as such side reboilers and condensers are employed as hereinabove described.

This modification and others should be apparent to those skilled in the art from the teachings contained herein.

The invention is further illustrated by the following example, but the scope of the invention is not to be limited thereby.

EXAMPLE

A fractionator, as illustrated in FIG. 2, containing 20 plates, is operated in accordance with the conditions tabulated below. The liquid sidestream is withdrawn from the 4th plate (counted from the top) and the vapor is intorduced into the 9th plate (counted from the top) of the fractionator. The feed is natural gas.

|  | Feed lb. moles/ hr. | Top product, lb. moles/ hr. | Bottoms product, lb. moles/ hr. | Side stream, lb. moles/ hr. | Internal vapor lbs. moles/ hr. |
|---|---|---|---|---|---|
| $CH_4$ | 18,090.53 | 18,078.48 | 22.5 | 2,570.05 | 1,935.00 |
| $C_2H_6$ | 1,798.76 | 1.83 | 1,796.93 | 813.05 | 543.95 |
| $C_3H_8$ | 477.87 |  | 447.87 | 69.70 | 29.15 |
| $I-C_4H_{10}$ | 76.55 |  | 76.55 | 3.26 | 1.78 |
| $n-C_4H_{10}$ | 66.72 |  | 66.72 | 2.36 | 1.26 |
| $I-C_5H_{12}$ | 14.61 |  | 14.61 | 0.09 | 0.11 |
| $n-C_5H_{12}$ | 7.83 |  | 7.83 | 0.02 | 0.04 |
| $C_6H_{14}$ | 19.13 |  | 19.13 | 0.01 | 0.04 |
| Total | 20,522.00 | 18,080.31 | 2,441.69 | 3,458.54 | 2,511.33 |
| Temperature,[1] °F | −100 | −134 | +112 | [2] −113/−30 | −39 |
| Pressure, p.s.i.a | 500 | 490 | 500 | 495 | 495 |

[1] The feed prior to passage through heat exchanger 103 is at a temperature of −20° F.
[2] The sidestream is vaporized over the temperature range from −113° F. (boiling point) to −30° F. (dew point).

Refrigeration recovered by side stream vaporization: 12MM B.t.u./hr.

Without a side vaporizer this refrigeration would have to be supplied from an external source.

This invention is generally applicable to the fractionation of any vapor, liquid or vapor-liquid stream. The process of the invention is particularly applicable to fractionation processes having a wide temperature difference between the overhead and bottoms temperatures and especially those processes wherein either the overhead or bottoms product is predominant in the feed; e.g., fractionation of ethylene and ethane, separation of air. The process of the invention has resulted in especially good results in a natural gas separation process.

The advantages of the process of the invention should be apparent to those skilled in the art. Thus, in employing side reboilers as heretofore known in the art, the reboiled vapor for a particular stage is generated from the liquid immediately above that particular stage and therefore, the vaporization is effected by a constant temperature heat transfer. In accordance with the invention, the reboiled vapor required for a particular stage is produced by completely vaporizing liquid withdrawn from a stage having a liquid composition identical to the vapor for the particular stage and the heat of vaporization for the liquid is supplied over the whole temperature range between bubble point and dew point of the withdrawn liquid. This temperature range is entirely below the temperature of the liquid of the stage which was heretofore employed for producing the vapor for the particular stage, resulting in an overall heat savings. The above is equally applicable to the operation of the side condenser in accordance with the invention.

Many modifications and variations of the present invention are possible in light of the above teachings. It is, therefore, to be understood that within the scope of the appended claims, the invention may be practiced otherwise than as particularly described.

What is claimed is:

1. In the fractionation of natural gas in a fractionation zone containing a plurality of liquid-vapor contacting stages, the improvement comprising: providing reflux to a first intermediate contacting stage of said fractionation zone, said reflux being provided by withdrawing a vapor sidestream from a contacting stage of the fractionation zone having a vapor composition most nearly approximating the liquid composition of said first intermediate stage, substantially completely condensing said vapor sidestream passing the condensed sidestream as reflux to said first intermediate contacting stage; and providing reboil to a second intermediate contacting stage of said fractionation zone, said reboil being provided by withdrawing a liquid sidestream from a contacting stage of the fractionation zone having a liquid composition most nearly approximating the vapor composition of said second intermediate stage, substantially completely vaporizing said liquid sidestream and passing the vaporized sidestream as reboil to said second intermediate contacting stage.

2. In a fractionation process wherein a feed is introduced into a fractionation zone containing a plurality of liquid-vapor contacting stages to provide overhead and bottoms products and reflux is provided to a first intermediate contacting stage of said fractionation zone, the improvement comprising:

withdrawing a vapor sidestream from a second intermediate contacting stage lower than the first intermediate contacting stage having a vapor composition most nearly approximating the liquid composition of said first intermediate contacting stage; substantially completely condensing said vapor sidestream and employing said condensed vapor sidestream as reflux for the first intermediate contacting stage.

3. The process as defined in claim 2 wherein the first and second intermediate contacting stages are in the rectification portion of the fractionation zone.

4. The process as defined in claim 2 wherein the feed is natural gas.

5. In a fractionation process wherein a feed is introduced into a fractionation zone containing a plurality of liquid-vapor contacting stages to provide overhead and bottoms products and reboil is provided to a first intermediate contacting stage of said fractionation zone, the improvement comprising:

withdrawing a liquid sidestream from a second intermediate contacting stage higher than the first intermediate contacting stage having a liquid composition most nearly approximating the vapor composition of said first intermediate contacting stage; substantially completely vaporizing said liquid sidestream and employing said vaporized liquid sidestream as reboil for the first intermediate contacting stage.

6. The process as defined in claim 5 wherein the first and second intermediate contacting stages are in the stripping portion of the fractionation zone.

7. The process as defined in claim 5 wherein the second intermediate contacting stage is in the rectification portion of the fractionation zone and the first intermediate contacting stage is in the stripping portion of the fractionation zone.

8. The process as defined in claim 7 wherein the liquid sidestream is vaporized by indirect heat transfer with the feed.

9. The process as defined in claim 5 wherein the feed is natural gas.

References Cited

UNITED STATES PATENTS

| | | | |
|---|---|---|---|
| 2,113,130 | 4/1938 | Dunham | 208—358 |
| 2,125,325 | 8/1938 | Youker | 208—350 |
| 2,404,677 | 7/1946 | Wilson | 208—358 |
| 2,487,147 | 11/1949 | Latchum | 208—340 |
| 2,871,275 | 1/1959 | Gerhold | 208—351 |
| 3,207,692 | 9/1965 | Van Kleef et al. | 208—358 |
| 3,368,966 | 2/1968 | Borst et al. | 208—351 |
| 2,301,304 | 11/1942 | Maxwell et al. | 208—358 |

HERBERT LEVINE, Primary Examiner

U.S. Cl. X.R.

203—98, 358